(12) United States Patent
Acker

(10) Patent No.: US 10,208,967 B1
(45) Date of Patent: Feb. 19, 2019

(54) METHODS AND APPARATUS FOR REMOTELY MONITORING AND/OR CONTROLLING A PLUMBING SYSTEM

(71) Applicant: Advanced Conservation Technologies Dist. Inc., Costa Mesa, CA (US)

(72) Inventor: Larry K. Acker, Costa Mesa, CA (US)

(73) Assignee: Advanced Conservation Technology Distribution, Inc., Costa Mesa, CA (US)

( * ) Notice: Subject to any disclaimer, the term of this patent is extended or adjusted under 35 U.S.C. 154(b) by 44 days.

(21) Appl. No.: 15/362,000

(22) Filed: Nov. 28, 2016

Related U.S. Application Data

(63) Continuation of application No. 14/092,040, filed on Nov. 27, 2013, now Pat. No. 9,513,019.

(51) Int. Cl.
| | | |
|---|---|---|
| *F24D 19/10* | (2006.01) | |
| *G05B 15/02* | (2006.01) | |
| *F24H 9/20* | (2006.01) | |
| *F04D 13/00* | (2006.01) | |
| *F04D 15/00* | (2006.01) | |

(52) U.S. Cl.
CPC ......... *F24D 19/1081* (2013.01); *F04D 13/00* (2013.01); *F04D 15/00* (2013.01); *F24D 19/1063* (2013.01); *G05B 15/02* (2013.01); *G05B 2219/23051* (2013.01); *G05B 2219/23406* (2013.01)

(58) Field of Classification Search
CPC .. F24D 19/1081; F24D 19/1063; F04D 15/00; F04D 13/00; G05B 15/02; G05B 2219/23051; G05B 2219/23406
See application file for complete search history.

(56) References Cited

U.S. PATENT DOCUMENTS

| | | | | |
|---|---|---|---|---|
| 4,798,224 A | | 1/1989 | Haws | |
| 4,945,942 A | | 8/1990 | Lund | |
| 5,042,524 A | | 8/1991 | Lund | |
| 5,205,318 A | | 4/1993 | Massaro et al. | |
| 5,277,219 A | | 1/1994 | Lund | |
| 5,385,168 A | | 1/1995 | Lund | |
| 5,775,372 A | * | 7/1998 | Houlihan | F24D 17/00 137/337 |
| 5,829,467 A | * | 11/1998 | Spicher | F24D 17/0078 137/14 |
| 5,829,475 A | * | 11/1998 | Acker | F24D 19/1051 137/337 |
| 6,039,067 A | * | 3/2000 | Houlihan | E03B 7/04 137/337 |
| 6,212,894 B1 | * | 4/2001 | Brown | F24D 19/1054 236/20 R |
| 6,286,764 B1 | * | 9/2001 | Garvey | G05D 7/0635 236/12.12 |

(Continued)

*Primary Examiner* — Ramesh B Patel
(74) *Attorney, Agent, or Firm* — Carlos A. Fisher

(57) ABSTRACT

Methods and compositions for controlling and monitoring residential and commercial pumping systems. Preferably, the controlling and monitoring functions include a remotely located controller component capable of displaying alerts and/or from which a user may input commands regulating the functioning of the plumbing system. In particularly preferred examples, the plumbing system is an "on command" hot water system in which hot water availability, use and energy efficiencies and conservation are monitored and maximized.

12 Claims, 3 Drawing Sheets

(56) References Cited

U.S. PATENT DOCUMENTS

| | | | | |
|---|---|---|---|---|
| 6,587,739 B1* | 7/2003 | Abrams | G05B 15/02 | 340/12.32 |
| 6,612,267 B1* | 9/2003 | West | F24D 3/08 | 122/13.3 |
| 6,895,985 B2* | 5/2005 | Popper | E03B 7/04 | 137/2 |
| 6,929,187 B2* | 8/2005 | Kempf | E03B 7/045 | 236/12.11 |
| 6,962,162 B2* | 11/2005 | Acker | E03B 7/04 | 137/1 |
| 7,007,858 B2* | 3/2006 | Cui | F24H 1/52 | 237/19 |
| 7,036,520 B2* | 5/2006 | Pearson, Jr. | F24D 17/0078 | 126/362.1 |
| 7,779,857 B2* | 8/2010 | Acker | F24D 17/0026 | 137/337 |
| 7,962,248 B2* | 6/2011 | Flohr | H02J 3/14 | 323/212 |
| 8,051,381 B2* | 11/2011 | Ebrom | G05B 15/02 | 340/286.02 |
| 8,162,236 B2* | 4/2012 | Rodenbeck | E03C 1/057 | 239/390 |
| 8,231,064 B2* | 7/2012 | Lum | E03B 1/048 | 137/337 |
| 8,438,672 B2* | 5/2013 | Reeder | E03C 1/055 | 4/623 |
| 8,505,498 B2* | 8/2013 | Acker | F24D 17/0078 | 122/20 R |
| 8,523,001 B2* | 9/2013 | Acker | F16J 3/02 | 220/581 |
| 8,606,413 B2* | 12/2013 | Picton | E03B 7/071 | 700/282 |
| 8,630,741 B1* | 1/2014 | Matsuoka | H04L 12/2829 | 700/276 |
| 8,985,063 B2* | 3/2015 | Adachi | F24H 1/523 | 122/14.1 |
| 9,182,159 B2* | 11/2015 | Hatada | F25B 27/00 | |
| 9,195,242 B2* | 11/2015 | Zobrist | G05D 23/19 | |
| 9,213,998 B2* | 12/2015 | Besore | G06Q 50/06 | |
| 9,234,664 B1* | 1/2016 | Hayner | F24D 3/02 | |
| 2003/0063978 A1* | 4/2003 | Takahashi | F04B 49/065 | 417/3 |
| 2004/0267385 A1* | 12/2004 | Lingemann | G05B 15/02 | 700/83 |
| 2006/0203880 A1* | 9/2006 | Batcho, Sr. | G01K 3/08 | 374/147 |
| 2008/0262857 A1* | 10/2008 | Perera | G06Q 30/00 | 705/1.1 |
| 2010/0076615 A1* | 3/2010 | Daniel | F03D 9/00 | 700/293 |
| 2010/0161082 A1* | 6/2010 | Ebrom | G05B 15/02 | 700/17 |
| 2015/0148971 A1* | 5/2015 | Acker | F24D 19/1063 | 700/282 |
| 2017/0227299 A1* | 8/2017 | Eustis | F28D 20/0034 | |

* cited by examiner

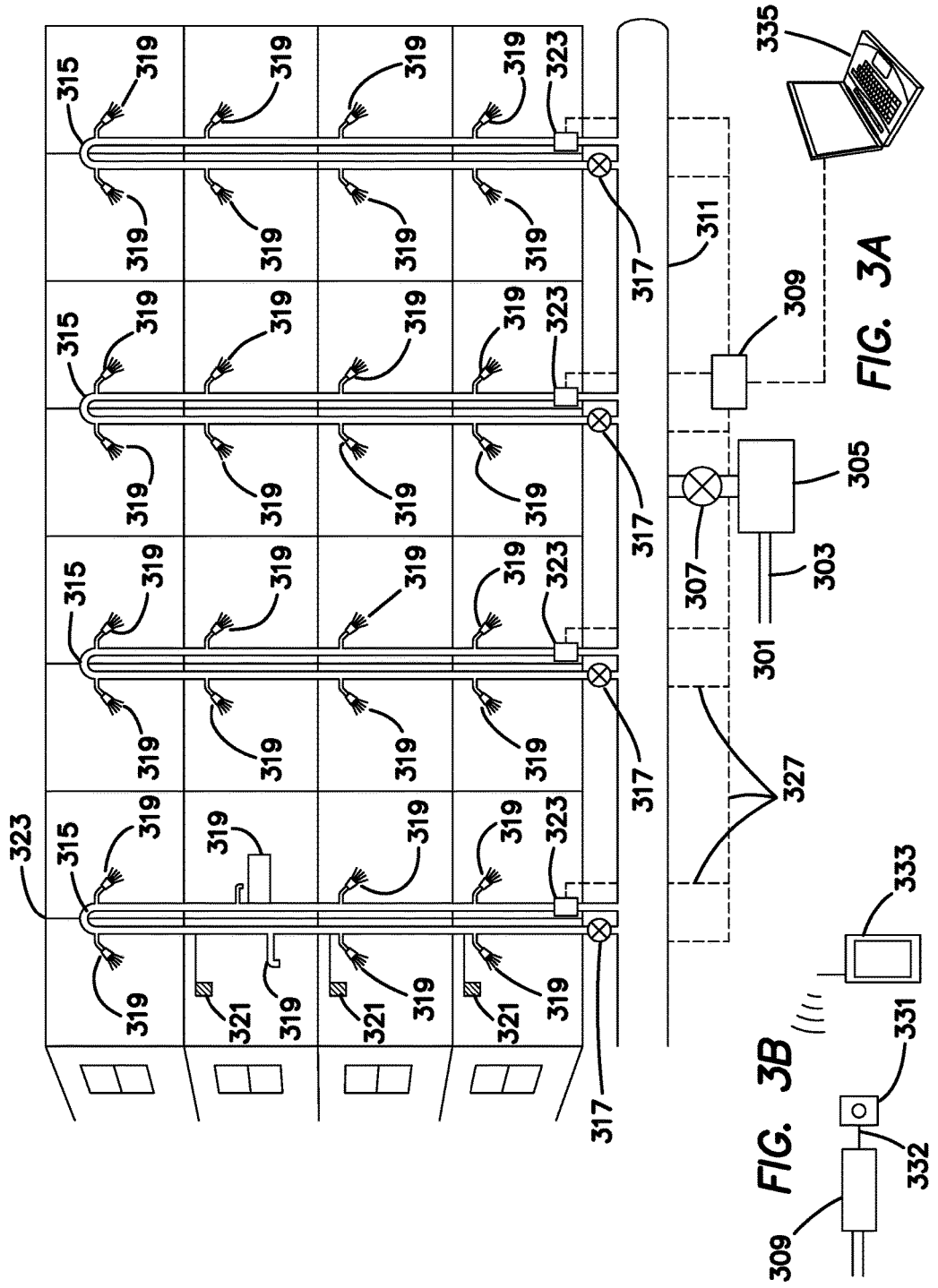

METHODS AND APPARATUS FOR REMOTELY MONITORING AND/OR CONTROLLING A PLUMBING SYSTEM

This is a continuation of U.S. patent application Ser. No. 14/092,040, filed Nov. 27, 2013, which application is hereby incorporated by reference herein in its entirety.

The present invention is generally directed to plumbing systems and more particularly to operation, control and monitoring of plumbing systems. In preferred examples, the invention is directed to controlling, sensing, and/or monitoring of plumbing systems, such as "on demand" or "on command" type hot water plumbing systems, at a distance remote from the pump or hot water source of the system. In some examples, controlling, monitoring and/or sensing may be done wirelessly, through digital USB, Ethernet or internet connections such as DSL or cable, or at least partially through existing electrical supply lines, such as AC power supply lines, in conjunction with one or more microprocessor in a remote controller component. Such remote controlling, sensing, and/or monitoring systems permits a user to optimize the efficient use of power and water resources towards the attainment of high thermal and economic efficiency.

Water and energy conservation is of utmost importance for both residential and commercial plumbing systems. In a dwelling, a considerable amount of thermal energy may be wastefully dissipated from hot water lines which provide hot water to plumbing fixtures, such as domestic wash basins, showers, dishwashers, washing machines, etc. Commercial establishments also experience wasteful water and energy losses due to continuously running hot water recirculation systems or for timing or delivering hot water to numerous fixtures, such as in hotels and the like. In both home and commercial establishments, if cooler water is allowed to run down the drain while waiting for hot water to be delivered to the fixture from a remote hot water source, a substantial waste of water (water loss) may occur.

In some homes and many commercial establishments, such water loss may be reduced by providing plumbing systems that continuously circulate hot water from a hot water source to the fixture and back to the hot water source. In this arrangement, a supply of hot water is always adjacent to a plumbing fixture despite the remote position of the hot water source.

However, while this arrangement reduces water loss, it is not energy efficient because the array of pipes interconnecting the plumbing fixtures and the hot water source provide a large surface area for thermal radiation to occur. In addition, continuously running a recirculation pump contributes to additional expense, which may be particularly egregious as the costs of electrical energy continue to increase.

Methods for reducing thermal losses in both circulating and non-circulating plumbing systems have included the installation of insulation on the hot water delivery lines and/or the hot water source and or storage tanks which feed the plumbing fixtures. While the installation of such insulation slows the dissipation of heat, no savings occur over an extended period of time in non-circulating systems because intermittent use of hot water through the lines still allows hot water to cool to ambient temperatures. That is, the insulation merely delays the heat dissipation but does not reduce is.

Hot water command systems have been developed, such as for example, set forth in U.S. Pat. Nos. 5,277,119; 5,385,161; 5,829,475; 6,962,162; and 8,505,498. The system described in these patents significantly reduces water and energy loss through the use of an on command control. That is, whether a recirculation conduit is utilized or a cold water line is utilized for circulation of water, such circulation is initiated only upon command by a user. Such command may be a manual switch, temperature sensor or the like. Current "on demand" or "on command" hot water systems may utilize a controller component such as a microprocessor to sense parameters such as temperature, pressure, time, and the like and to control components of the hot water system. Such controller components are located on or near the pump or hot water source (such as a hot water heater or boiler) so as to control the activation or deactivation of the pump and/or adjust the temperature of the hot water source according to one or more such parameters.

Certain examples of the present invention provide for a command-regulated hot water system which utilizes at least one controller component, preferably remotely placed, to provide any combination of a variety of safety-related and/or energy- and water-efficient monitoring and/or control of the delivery of hot water to a plumbing fixture or appliance, and to control the components of such a system based upon analyses of actual use of water, for example, hot water, at the installed location. Such a controller component may be comprised in or in association with, for example, a computer or mobile computing device such as a mobile telephone, tablet computing device or a laptop computer.

SUMMARY OF THE INVENTION

In one example, the invention comprises a controller component, programmed to operate an "on command" hot water system ("HWS"), and structured to control said system from a remote location. By a "remote location" is meant that the remote controller component resides in a location other than proximate the hot water system's circulating pump or hot water source; very preferably the remote controller component may reside in a different room, area, building, or geographical location than the one occupied by the circulating pump or hot water source. Of course, the system may employ more than one controller component, such as a local controller component and a remote controller component, configured to work in concert with each other. However, in preferred examples, the present invention involves at least one remotely located controller component.

A remotely located controller component structured to control the HWS means a controller component connected, or structured to be connected, to the HWS by means of a communication system such as, without limitation, a power line networking (PLN), DSL or cable internet connection, an ethernet system, a USB or other universal computer buss, or a wireless networking system. In certain applications, the controller component may reside within a computer, for example a general purpose computer, residing in a location remote from the HWS and configured to run HWS control software such that it sends signals to, and receives signals from, one or more component of the HWS, thereby controlling the operation of the HWS. By "signal" or "signals" is meant analog and/or digital signals, including in certain cases, a simple electrical switch, conveyed either wirelessly or directly.

In certain examples, a controller component may be configured to function wirelessly. For example, the controller component may be comprised in or to function in conjunction with a general purpose computer, a smartphone, a tablet computer, or other device comprising a microprocessor component and configured to communicate over the internet through, for example, and without limitation, WiFi, Bluetooth, satellite or a cellular telephone network, such as 3G or 4G.

In certain configurations, a controller component may reside in a room or other location remote from the HWS, but still communicate with the HWS system directly, rather than wirelessly. For example, the controller component may be connected to the HWS through a power line network (PLN). A power line network is a communications network that permits data communications through pre-existing premises wiring, for example, within a single building, or a network of buildings. PLNs operate by adding a modulated carrier signal, such as an amplitude-modulated signal, to the premises' wiring system. Typically, the carrier wave is between about 20 kHz and about 200 kHz, and is modulated by digital signals. The signals can, for example, be detected by a receiver connected directly to, or as part of, an HWS component. The receiver may, for example, be plugged into a premises' AC outlet, or can be permanently wired into place. For example, a PLN adaptor that plugs into a power outlet can establish an Ethernet connection using the existing wiring in the premises. Thus, using two such adaptors (as a non-limiting example, one PLN adaptor plugged into a power outlet and connected via an Ethernet cable to a controller component contained in a computer (the "controller component end" of the network connection), and the other adaptor (the "HWS end" of the network connection) plugged into a power outlet and connected via an Ethernet connection to a HWS component), the remotely located controller component can be used to monitor and/or control the HWS system. HWS components may comprise, for example (and without limitation), one or more of a circulating pump, a hot water source, a timer, a flow sensor, a sound detector, a flow valve, a pressure sensor, a moisture sensor and a temperature sensor.

In other examples the direct connection may be made using conventional cabling, such as by Ethernet; local networking cables; USB or similar universal digital busses; cellular or conventional telephone network lines and terminals, cable television lines, and the like.

When such a remote networking connection is made, the controller component may be used in conjunction with the controlling, detecting, and/or monitoring of other premises-related equipment and services. For example, if the controller component is comprised in a microprocessor of a computer, the computer can also be programmed to control alarm systems, appliances such as refrigerators, air conditioning, heating, door locks, lighting, and the like, in addition to the HWS, and to monitor utilities, such as water usage, electrical usage, and the like.

Alternatively or additionally, a controller component may be used in conjunction with, for example, a directly wired (e.g., cable or DSL), and/or a wireless data, internet, or cellular telephone data network (for example, satellite, Bluetooth, Edge, 3G or 4G) to send data to and receive data from other computing devices, such as other computers, mobile telephones, tablet computing devices, and the like. In this way, relevant parameters of the HWS may be manually monitored (including, without limitation, water flow, water line pressure, water temperature, pump status and/or flow rate, hot water source status and/or thermostat temperature, moisture in surrounding rooms [indicating a water line break], time of day and day of week, timer status and settings, and the like) for example, by a premises owner or administrator, who may receive updates or alerts from the controller component informing them of the status of the HWS at a given time, and who may respond to such an alert with appropriate actions or input, such as turning the HWS, pump, or hot water source on or off, or adjustment of hot water source temperatures or temperature parameters such as the slope of a water temperature gradient as a signal to turn on or off the pump.

A HWS system having a hot water circulating pump in accordance with the present invention may include a remotely located controller component for detecting, measuring, or sensing an event, for example, activation or deactivation of the pump; or for turning the pump on or off. In one exemplary HWS, a temperature sensor, in conjunction with a controller component, senses a change in water temperature over a temperature gradient time period, such as about 5 seconds or more, or about 10 seconds or more, or about 30 seconds or more, or about 45 seconds or more, or about 1 minute or more, or about 2 minutes or more, or about 3 minutes or more, or about 4 minutes or more, or about 5 minutes or more. The controller component may be programmed to turn off the circulating pump if a $\Delta T$ increase in temperature over this temperature gradient time period exceeds a certain number of degrees (the $\Delta T$ threshold), for example 1° F. or more, 2° F. or more, 3° F. or more, 4° F. or more, 5° F. or more, 10° F. or more, or 20° F. or more. In certain examples, this $\Delta T$ threshold may be adjustable by a remote user.

In certain cases the HWS controller component may record for each sensed event at least one parameter which may include (without limitation) at lest one parameter selected from the group consisting of the date, the day of the week, hot water source temperature, hot water source start or stop time, circulating pump start and/or stop time, the $\Delta T$ threshold, the presence or absence of water in a water line, the presence of detectable sound in a water line, the duration of pump activation, water pressure, the hot water flow, the water temperature and cold water flow.

An important aspect of certain examples involves a controller component having a memory function, permitting incoming data to be stored for subsequent calculations, statistical analysis, display, or archiving.

The HWS of the present invention may comprise a timer, for example, a timer built in as part of the circulation pump or a timer comprised with the controller component, which is fully adjustable to turn the HWS on or off, as desired, at particular times, or after a particular timer time period has elapsed. The timer turning the pump on would very preferably be subject to an override if the $\Delta T$ threshold is exceeded, since in this event there is already sufficient hot water demand to prime the hot water line(s).

The controller component may comprise a safety feature comprising a "lock out" feature whereby, when the controller component detects a lack of water (such as a loss of water pressure or flow), or a lack of hot water in a water line, the pump is turned on for a predetermined circulation time period, such as about 4 minutes to about 10 minutes, to attempt to re-prime the lines.

Furthermore, in certain examples, the controller component may analyze recorded parameters, for example, to determine patterns of pump activity, water presence or flow, water pressure, temperature, period of pump activity or inactivity, period of hot water source activity or inactivity, and, according to present and/or adjustable criteria, may activate or inactivate the pump, water flow pattern, and/or hot water source in accordance with such patterns in order to optimize the efficient functioning of the HWS and the conservation of water and electricity.

Thus, according to certain examples, a hot water system comprises a remotely located controller component of the present invention through which the user may receive information concerning the current or historical state of the HWS; preferably, the user can send information via the remotely located controller component to the HWS, confirming or causing a change in the operation of at least one component of the HWS for a period of time.

A controller component may, for example, reiterate one or more of the above noted steps for providing updated patterns of pump activity, thus enabling pump activation to be continually changed in response to usage of the system.

More particularly, a controller component may also include analyzing the determined or updated patterns for potential problems, such potential problems including, but not limited to, identifying a leak in the plumbing system, excess running of the pump, and non-seasonal changes in a relationship between hot and cold water use. Also, temperature sensors may be used to detect freezing temperature and circulating water to avoid damage. Preferably, the HWS can then send an alert to the remotely located controller component; the controller component may be programmed to respond to the alert with predetermined instructions to one or more HWS component which may correct the indicated problem by, for example, shutting the HWS down, starting or shutting down the circulating pump, adjusting the hot water source temperature, or other corrective actions. Alternatively, or additionally, the remotely located controller component may be programmed to permit the user to perform functions such as these manually, either alone, or in conjunction with one or more additional controller components.

Additionally, or alternatively, the remotely located controller component may display an alert providing a HWS user or administrator with the opportunity to take a corrective or alternative action with respect to the operation of the HWS, and/or convey the information to other remote communications devices, such as computers, tablet computing devices, smartphones, Google® glass, or the like, either with or without the opportunity or need for the recipient to take appropriate intervening action, such as sending a signal to the HWS from a remote location using the remotely communications devices.

The present invention may also provide methods for managing water usage and reducing water waste and energy waste for example, by using the remotely located controller component of the present invention, in which the HWS is monitored and controlled based on the actual hot water use, both historical and present, of the plumbing system.

The present invention may comprise software instructions installed on a remotely located controller component which carry out steps of the methods described herein.

In some examples, the present invention encompasses a hot water recirculation system and apparatus comprising a remotely located controller component which includes a hot water source, at least one plumbing fixture having a hot water inlet, a conduit in fluid communication with the hot water source and the plumbing fixture hot water inlet for enabling circulation of hot water from the hot water source to the plumbing fixture and return of the circulated water to the hot water source, and a pump for circulating hot water through the conduit. A controller component is structured for sensing, detecting, monitoring, and/or controlling events germane to the efficient functioning of the HWS, such as, without limitation, the time of day the date; the day of the week, hot water source temperature; hot water source start or stop time; circulating pump start and/or stop time; the $\Delta T$ threshold; temperature gradient time periods; timer time periods; circulation time periods; analysis time periods; temperature limits; the presence or absence of water in a water line; the presence of detectable sound in a water line; the recognition of voice commands to at least one HWS component, the duration of pump activation; water pressure, including drops or increases in water pressure; hot water flow rate; water temperature; cold water flow rate; activation of the hot water source; and/or activation of the circulating pump. The controller component then may correlate for one or more such event at least one parameter which may include, without limitation, the date; day of the week; time; pump settings, timer settings, hot water source temperature settings, duration of pump activation; hot water flow; water temperature; $\Delta T$; water pressure; and cold water flow. The controller component is further preferably structured to analyze the recorded events and parameters to determine or infer patterns of hot water usage over an analysis time period, thereby regulating pump activation and activating the pump in accordance with the determined pattern.

In another example of the present invention, a remotely located controller component for operating a residential or commercial plumbing system may generally detect, sense, and/or measure events, with each event comprising at least one event selected from the group consisting of: measurement of water temperature and/or water flow in a line or conduit to and from a hot water source; detection of water leaks in hot and cold water lines; detection of water pressure in water lines or conduits; measurement of water temperature in hot water flow from a hot water source; measurement of moisture in walls and floors; detection of activation of water flow dampers; measurement of room temperature in each of a plurality of rooms; and detection of operation of a water circulation pump.

The HWS controller component may further record for at least one of the sensed events at least one parameter selected from the group consisting of the time of day; the date; the day of the week, hot water source temperature; hot water source start or stop time; circulating pump start and/or stop time; the $\Delta T$ threshold, temperature gradient time periods; timer time periods; circulation time periods; analysis time periods; temperature limits; the presence or absence of water in a water line; the presence of detectable sound in a water line; the duration of pump activation; water pressure; the hot water flow; the water temperature; cold water flow; and/or activation of the circulating pump. Thereafter, in accordance with this example of the present invention, the recorded parameters are analyzed to determine patterns and water flow, circulation, water temperature and efficient water use is effected with conservation of energy.

In other examples, the controller component exports an alert or other HWS data to a wireless device or service, such as (without limitation) a smartphone, a tablet device, a computer, or a cloud computing server. A user of the wireless device or service may receive an alert or other information concerning the HWS and take corrective action, such as by starting or stopping the circulating pump, or either adjusting the temperature of, shutting off, or turning on the hot water source (such as the hot water heater).

In other examples, the user of such a wireless device or service may take a similar action without receiving an alert; for example, a homeowner may turn off the HWS before leaving for vacation, and then may use the wireless device or service to restart the HWS before returning home.

Of course, based upon the disclosure of this specification, the person of ordinary skill in the art will immediately envision various other examples of the compositions and methods of the present invention, in which other or additional HWS components are used in, or HWS components omitted from, the exemplified system and method, and in which the controller is structured to function in accordance with each such other example.

BRIEF DESCRIPTION OF THE DRAWINGS

The advantages and features of the present invention will appear from the following description when considered in conjunction with accompanying drawings in which:

FIG. 3A is a flow diagram of another example of the present invention directed to an "on command" hot water recovery system utilizing a hot water source, a large bore "trunk" conduit and feeder loop "branches" for supplying hot water to a multi-room structure, and with data transmission sent to an exemplary remotely located controller component located in a computer.

FIG. 3B is a detail of the HWS shown in FIG. 3A, showing data transmission to a wireless mobile computing device.

DETAILED DESCRIPTION

Figure 1:
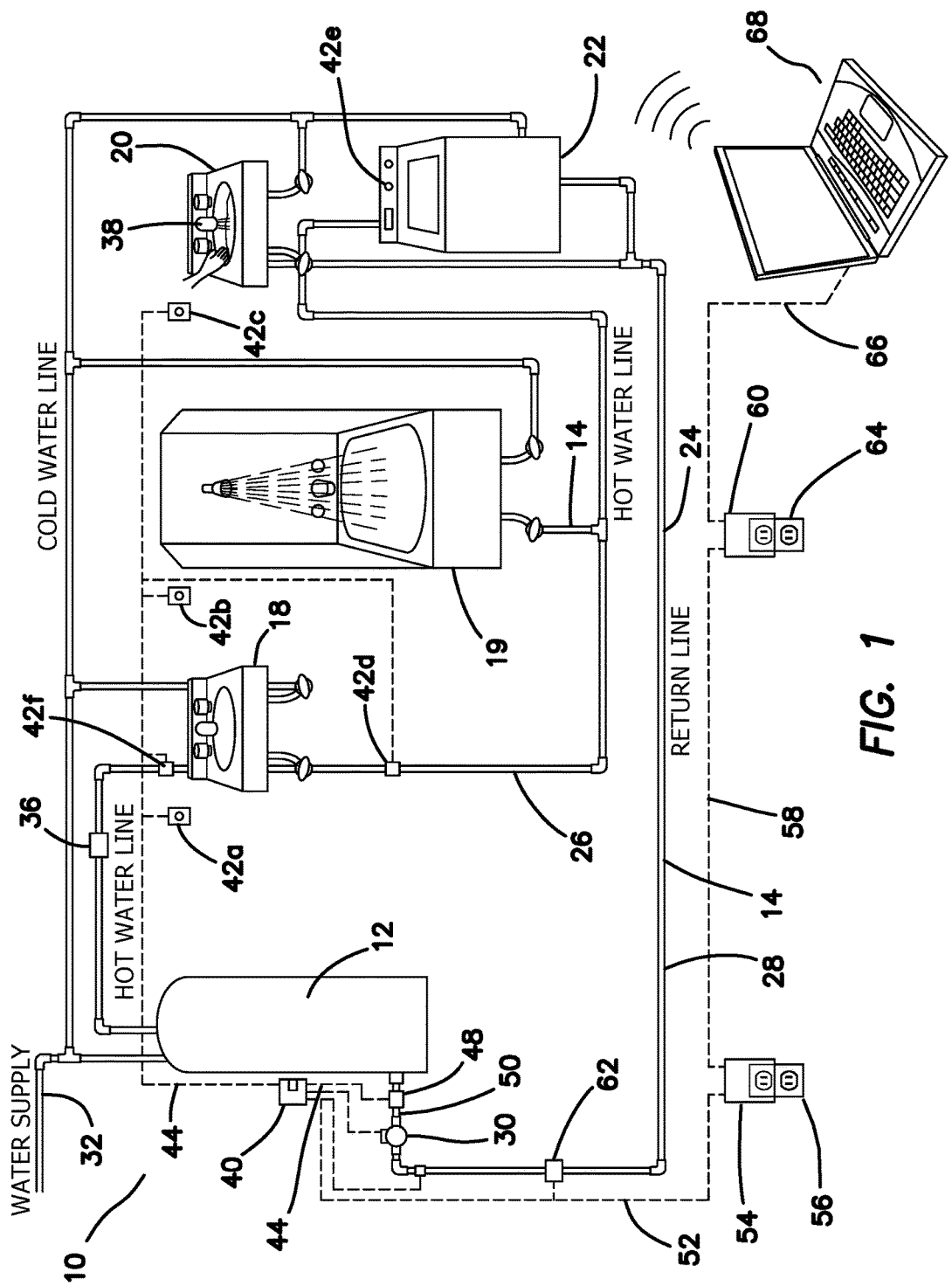
FIG. 1 is a flow diagram of an "on command" hot water recirculation system in accordance with the present invention generally showing a hot water source (e.g., a hot water heater) connected to a dedicated recirculating conduit in fluid communication with at least one plumbing fixture, along with a recirculating pump, switches and a controller component for activating and deactivating the pump the hot water source, and/or adjusting, sensing, detecting and or measuring other HWS components based upon a analysis of historical and instantaneous hot water usage.

With reference to FIG. 1, a hot water recirculation system 10 is shown in accordance with the present invention. The system 10 generally comprises various HWS components, which may include a hot water source, for example, a water heater 12, such as a gas, oil, solar, photovoltaic, or electric tanks or tankless heater, interconnected by means of pipes 14 with plumbing fixtures 18, 19, 20, 22, said pipes providing conduit means for enabling circulation of hot water from said hot water source 12 to each plumbing fixture 18, 19, 20 and return to the hot water source 12. The pipes 14 are thus in fluid communication with the hot water source 12 and the plumbing fixtures 18, 19, 20 in such a way as to establish a hot water loop 24.

More particularly, the pipes 14 may be comprised of a hot water supply line 26 which provides means for transferring hot water from the hot water source (such as a heater) 12 to each of the fixtures 18, 19, 20, 22 and a separate hot water return line 28 which provides means for enabling recovery of hot water in the pipes 14 and into the water heater 12, after usage of any one of the fixtures 18, 19, 20.

The hot water source 12 may be connected to a cold water source through inlet pipe 32. The hot water source 12 may be heated in any conventional manner. It should be appreciated that the hot water source 12 may be (without limitation) a conventional gas, electric, solar tank or tankless water heater, heater coils or other apparatus as described in e.g., U.S. Pat. No. 4,798,224, entitled "Automatic Hot Water Recovery System" or the apparatus described in U.S. Pat. No. 5,042,524, entitled "Demand Recovery System".

A pump 30 may be installed in the hot water loop 24 or as part of a water heater for providing means for circulating hot water through the loop 24.

In addition, the HWS may comprise HWS components including one or more sensor 36, which provides means for generating a signal. More particularly, the sensor 36 may, for example, comprise a flow switch which detects water flow through the pipes 14, for example, when a user opens a hot water valve, such as a faucet 38, on one of the plumbing fixtures 18, 19, 20, 22. The depicted drawing shows that a signal may be provided, for example, to a local controller component 40 by wire or wireless means. Alternatively or additionally, a signal may be provided directly to a remotely located controller component, such as a computer 68. The local controller component 40, if present, may be connected, for example, by an Ethernet cable 52, to a power line network (PLN) adaptor 54 which is plugged into a standard premises AC outlet 56. The PLN adaptor transmits signals (defined as a "sensor signal") from HWS components, which may include one or more of including time, pump run time, temperature, pressure, sound and other information, conveyed by the local controller component 40 through the standard premises wiring 58 to another PLN adaptor 60 also plugged into an AC adaptor 64 located remotely from the HWS, which is connected via a Ethernet cable 66 to a general purpose computer 68. The computer 68 memory or hard drive may comprise software for processing the sensor signals and displaying data, such as water usage, electrical usage, status of the system, and/or any malfunctioning HWS components. Using the computer, a user may, for example, turn the pump on or off, adjust temperature presets, temperature gradient time periods; timer time periods; circulation time periods; analysis time periods; temperature limits; the ΔT threshold and/or adjust any other HWS component configured to be monitored, or controlled by the remote controller component.

In the event a local controller component is not present, signals to and from HWS components to a remotely located controller component may be combined and routed directly to a PLN adaptor and then conveyed to the remotely located controller component, for example, as described above.

In this manner, the activating of the pump 30 may be sensed, and/or turned on and turned off in accordance with signals from the remotely located controller component.

Alternatively or additionally, further HWS components, such as, without limitation, a manual switch 42A, a proximity switch 42B, a motion detector 42C, a temperature sensor 42D, an appliance switch 42E or a sound or voice sensor 42F may be utilized to generate signals indicating use or nonuse of a fixture 18, 19, 20, 22, or of the pump or hot water source. The appliance switch 42E may be a microchip which is programmed to send a signal when the appliance 22 is activated for use but before actual start of an appliance cycle. The temperature sensor may be configured to work in conjunction with a controller component to determine changes in hot water temperature, such as whether the water temperature reaches a threshold temperature, or whether a change in water temperature (ΔT) in the conduit has occurred; thus, in conjunction with the controller component, turning the pump on or off, adjusting the hot water source temperature, or both.

Sensor 36 may be a flow switch of conventional construction which generates a signal, for example a digital, analog or electrical signal, in response to water flow through the pipe 14. Although the flow switch is shown disposed adjacent the hot water source 12, it may alternatively be disposed near any one or more of the fixtures 18, 19, 20, 22 or at a cold water inlet to the hot water source. Alternative to, or in addition to, the flow switch 36, a signal may be generated by means of, for example, a manually activated switch 42A interconnected with a controller component. The local controller component 40, if present, may include a processing microchip responsive to a plurality of signals from HWS components through an electrical line or digital cable, e.g., 44, or by wireless communication, for controlling the operating parameters of the HWS to optimize water and energy conservation in conjunction with the remotely located controller component.

The microchip of either or both the local controller component (if present) or remotely located controller components 40, 68 is preferably a programmable microprocessor which receives a sensor signal from one or more of the HWS components, performs processing of the sensor signal in accord with instructions contained or loaded into the microprocessor memory, and sends one or more control signal, for example, to a display, a wireless computing device, and/or back to HWS components. The processing step may include detecting, measuring, or sensing events (which may include events transmitted in the sensor signal from HWS components); with each event preferably comprising at least one event selected from the group consisting of measurement of water temperature and/or water flow in a conduit to and/or from a hot water source; detection of water leaks in hot and cold water lines; detection of water pressure in water lines or conduits; measurement of water temperature in hot water flow from a hot water source; measurement of moisture in walls and floors; detection of activation of water flow dampers; measurement of room temperature in each of a plurality of rooms; detection of a "power on" or "power off" condition; and detection of operation of a water circulation pump.

Preferably, the HWS components include a timer component. The timer component may reside as a separate HWS component, may be incorporated as part of a controller component, or may be integrated as part of another HWS component, such as a pump or hot water source. As with all HWS components, in a preferred embodiment, the timer component is configured to send sensor signals to a controller and to receive control signals from a controller. Additionally, preferably the timer component is configured to receive time of day and/or date data in the event of a loss of power to the HWS. For example, the timer component may be configured to receive time of day data directly from a satellite, from a wireless internet connection, or from a wireless cellular connection when power to the HWS is resumed. Alternatively, the time of day data may be provided in the form of control signal data from a controller component.

The remotely located controller component and the local controller component (if present) monitor signals from any of the sensors 36, 42A-42E, preferably as a function of time and time of day to determine, for example, the average time of day a fixture 18, 19, 20, 22 is used, and the duration of use. The microprocessor may collect data from the sensors for a predetermined analytical time period, (such period may depend on the sensor type, and may comprise, for example, seconds, minutes, hours, days or weeks. The controller component may update the analysis on a timely basis to determine when to turn the pump and/or other HWS components on or off, or to adjust parameters concerning the operation and optimization of the HWS. For example, the pump 30 may be turned on, or activated, shortly before the actual average use time; similarly the hot water source may be turned on, or the water heater adjusted at the same time before the actual average use time. The interval of anticipation can be adjusted so that hot water is circulated to the fixture 18, 19, 20, 22 prior to use. As the time of use may change, for example a switch to or from daylight savings time, the controller component may automatically adjust the time of pump 30 activation. In the event that a timer component receives time of day information directly from a wireless data source, the controller component may not always be involved in making such time adjustments.

In certain modes of use, no manual setting or resetting is required. If the fixtures are not used, the controller component will automatically adjust to a maintenance level of pump 30 activation, such as 5 minutes every 2 hours, or any other useful cycle that will tend to keep the conduit filled and replenish the hot water supply. This is particularly useful in commercial establishments such as hotels certainly and the like, as well as for home use.

However, in preferred examples while the HWS is configured to require no manual input, the HWS may accept such manual input, if provided, via a remotely located controller. Likewise, preferably the HWS system and remotely located controller component is configured to provide a remotely located user with alerts and other information, such as analytics, for example, concerning the efficiency of the HWS system, status of the system, temperature of the water in the conduit or at the hot water source, electricity use and water use during a period of time, such as a day, a week, a month, or a year, and the like. Moreover, in preferred examples, the remote controller component may be used to permit the user to manually control elements or components of the HWS and program or override the default automatic functioning of the HWS with new or modified instructions.

In certain examples, a controller component may receive and send signals to a valve 48, which may be provided for preventing any flow of water through the hot water pipes 14. The zone valve 48 may be disposed, as shown in FIG. 1, directly between the hot water source 12 and the pump 30, in the pump 30, or in the hot water source 112.

The valve 48 may be of a conventional type, such as, for example a zone valve, which provides complete closure of the pipe 14 at a valve junction 50. The zone valve may be built into the pump 30 or a water tank and is preferably comprised of a suitable material and structure that will provide an insulating barrier between water on either side of the valve 48 when the valve is in the "closed to flow" position, thus minimizing loss of heat from the hot water source 12 into water in the adjacent return line 28. When the zone valve 48 is in the closed position, the hot water source 12 is physically isolated from standing water in the return line 28. As noted above, the zone valve 48 may, if desired, be incorporated into the pump 30 or hot water source 12 and is preferably automated; that is, has a motor enabling it to open and close in response to a control signal.

The zone valve 48 is normally closed to a flow of water therethrough. During periods of nonuse of a plumbing fixture 18, the zone valve 48 is in a closed position, thus providing a positive barrier between the hot water source 12 and water in the return line 28. This prevents any circulation which may be caused by temperature differences. As depicted, the local controller component 40 is interconnected with a sensor 36 and/or 42A-42E and the zone valve 48 and provides means for causing the zone valve 48 to open and allow water flow therethrough in response to the control signal.

It should be appreciated that once the pump 30 has drawn a sufficient amount of hot water from the water heater 12 to reach all of the fixtures 18, 19, 20, 22, particularly the fixture most remote from the water heater 12, operation of the pump 30 may be stopped. For example, a temperature sensor in the hot water return line may, in conjunction with a controller component, sense an increase in the temperature ($\Delta T$) of the returning hot water, indicating that hot water is circulated in the HWS. The controller component may then turn the pump off.

A controller component 40 may be also electronically programmed to control a sequence of operation of the pump 30 and zone valve 48. For example, as indicated above, when the temperature sensor 62 has detected a preset, preferably adjustable, temperature increase ($\Delta T$ threshold) of between about 1° C. and about 15° C. this may indicate that the entire loop 24 is filled with hot water, and a control signal may be sent by the controller component causing the pump 30 to stop. At this point, controller component may case the zone valve 48 to close shortly or immediately thereafter and the system 10 will resume a standby position. The controller component function may be overridden, if desired, by appropriate manual switches (not shown).

Similarly, if the temperature sensor 62 indicates that the water temperature falls below a preset temperature a controller component may turn the pump and/or hot water source on for a period of time determined by the size of the HWS loop (such as 5 minutes, 10 minutes or 15 minutes), sufficient to heat the water lines and prevent damage due to freezing of the pipes.

In the present example, local controller component 40 is connected to HWS components 62, 30, 12, 36 and 42A-E and to Ethernet cable 52. Ethernet cable 52 is joined to a power line network (PLN) adaptor 54, which is plugged into a standard pre-existing premises AC outlet 56. The signal from local controller component 40 is then carried through premises wiring 58 to PLN adaptor 60, which is plugged into AC outlet 64. Another Ethernet cable 66 carries the signal to a remotely located controller component located in laptop computer 68.

Figure 2:
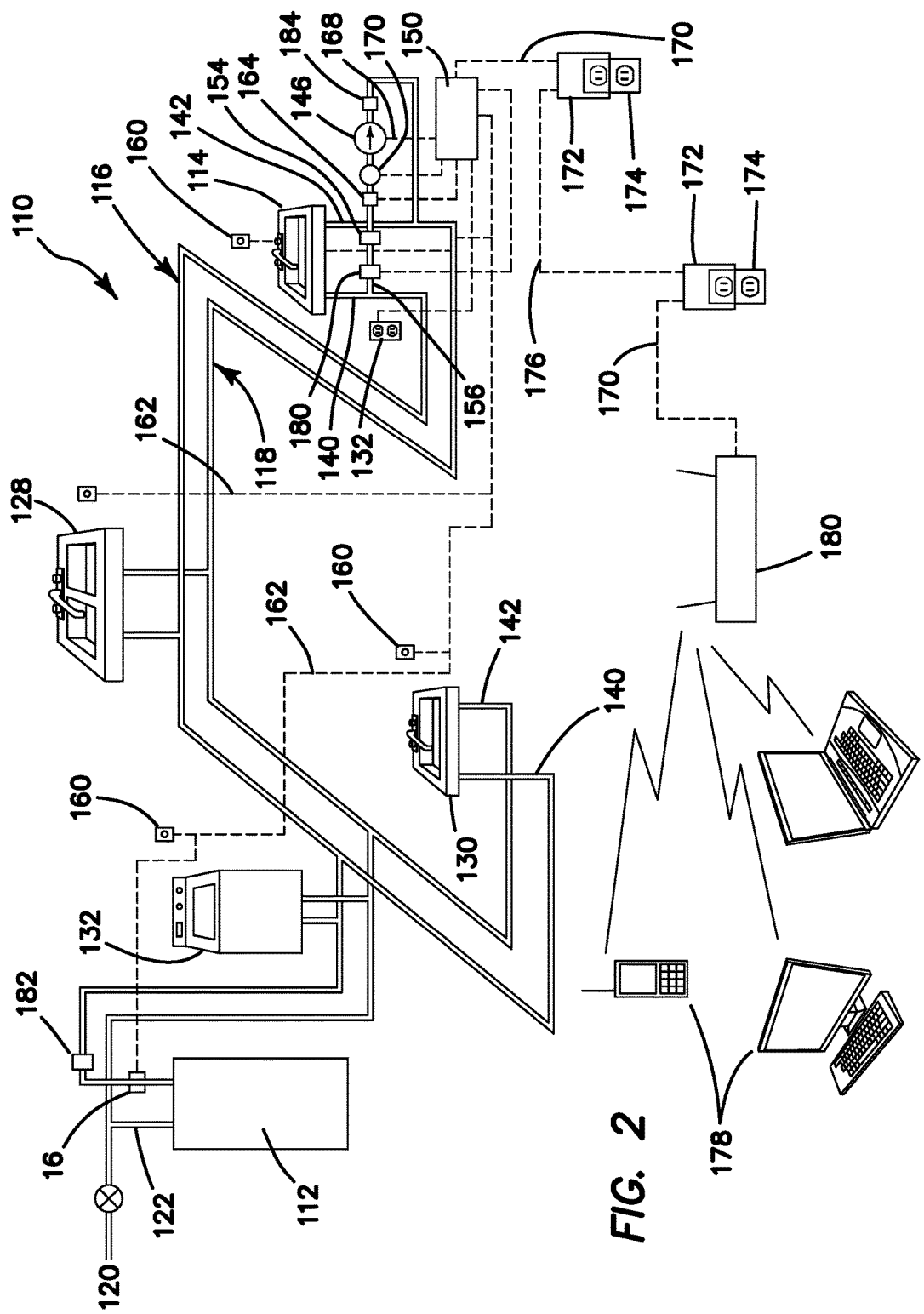
FIG. 2 is a flow diagram of another example of the present invention directed to an "on command" hot water recovery system utilizing a hot water source, a hot water delivery line connected between the hot water source and at least one plumbing fixture, a cold water delivery line between the plumbing fixture, a cold water source and a hot water source, a pump for circulation of water from the hot water delivery line through the cold water delivery line and into the hot water source, a switch for generating control signals, and a controller component responsive to a plurality of control signals for activating the pump based upon a statistical analysis of past controller component timing.

With reference to FIG. 2, there is shown, as an another example of the present invention, a hot water recovery system 110 which generally includes a hot water source 112 such as a gas or electric hot water heater, connected to a plumbing fixture such as a sink 114 by a hot water deliver line 116. It is to be appreciated that the hot water source 112 may be a water heater 112 as shown, an apparatus as described in U.S. Pat. No. 4,798,224, entitled "Automatic Hot Water Recovery System," or as shown in U.S. Pat. No. 5,042,524, entitled "Demand Recovery System", a geothermal source, a solar source, a photovoltaic source, or any other source of hot water. Also provided is a cold water delivery line 118 interconnecting the sink 114 with a cold water source 120 which is also interconnected with the hot water source 112 via a feed line 122.

Optional plumbing fixtures such as, for example, sinks 128, 130 and washing machines 132, may be provided along with other plumbing fixtures utilized in residences and businesses, all such fixtures being connected in a configuration with the hot water delivery line 116 and cold water delivery line 118 by feed lines such as 140 and 142, respectively. At a selected plumbing fixture, preferably the most remote fixture from the hot water source 112 along the hot water line 116, such as sink 114, a pump 146 is interconnected between the hot water delivery line 116 and the cold water delivery line 118 via the feed lines 140, 142 respectively; this type of connection may be termed a "cross connection". The pump 146 provides means for circulating water from the hot water delivery line 116 through the cold water delivery line 118 and back into the hot water source 112 via line 122, by utilizing the cold water delivery line as a return feeder to the hot water source 112. In this way, no separate recirculation line need be implemented or installed in existing systems. In order for the pump 146 to effect flow in a reverse manner through the cold water delivery line 118 and into the hot water tank 112, the pump 146 must, of course, develop sufficient pressure to overcome static water pressure in the line 118.

The hot water delivery system 110 of the present invention can be used in conjunction with an existing plumbing system, which may include the hot water source 112, hot and cold water delivery lines 116, 118, and at least one plumbing fixture 114. In this instance, the pump 146 may be installed approximate to the fixture fixture 114 without disturbing the reminder of the existing plumbing system. The advantages of this embodiment is significant in that no unwanted disruption of the home or business is needed in order to implement the hot water recovery system in accordance with the present invention.

A control system, or local controller component, 150 may be the same in function as hereinabove described controller component 40 or remotely located controller component 66 in FIG. 1, and provides a means for switching an electrical current outlet 152, or directly or indirectly sending data, to the pump 146 and any other HWS components in order to cause the pump 146 to circulate water, or to stop circulating water, from the hot water line 116 to the cold water return line 118.

As depicted in FIG. 2, sensor signals 162 and control signals 168 are shown as input and output respectively from local controller component 150; however, in other examples a local controller may be replaced with, for example, a compiler, router or modem (not shown) which serves to relay sensor data to a remotely located controller component, and control signals from the remotely located controller component to one or more HWS components. In such examples, the sensor and control signals may be relayed to and from the HWS either wirelessly or using a cable or other "wired" connection.

For example, (and without limitation) the sensor signals and control signals may be transmitted using a power line network, with such signals entering and exiting a "HWS-side" power line adaptor 172, wherein the signals are transmitted via a power line network (PLN) adaptor 172 which is plugged into a standard premises AC outlet 174. As shown, the sensor and control signals are routed through local controller component 150, connected to a power line adaptor 172 via an Ethernet cable 170. However, the signals may be routed in various alternative manners known to the person of skill in the art. For example, instead of being routed through a local controller component 150 these signals may be directed connected to the PLN adaptor 172 or, for example, wirelessly transmitted to and/or from a modem or router (not shown), which my or may not be itself connected to a PIN adaptor.

As shown in FIG. 2, the PLN adaptor 172 transmits sensor and/or control signals through the standard premises wiring 176 to another PLN adaptor 172 also plugged into an AC outlet 174 located remotely from the HWS; the signal may then be routed to a remotely located controller component.

FIG. 2 shows one of various possibilities; an Ethernet cable connects the remote PLN adaptor 172 with a wireless modem 180 that transmits the data signals via a cellular or wireless data network to a remotely located controller comprised in a mobile telephone, laptop computer, or other computing device 178.

In certain examples, it is envisioned that a user will be able in this or a similar manner to receive alerts, status and statistical data, and other information relating to the HWS in locations remote to the HWS, such as on a mobile telephone or tablet device. It is also envisioned that the user will be able to send commands from such a device to the HWS, for example, to turn on or off the HWS system (which may include the pump and/or the hot water source), or to override or modify the automated operation of the HWS, such as setting or adjusting temperature thresholds, setting or adjusting ΔT thresholds, setting or adjusting hot water source water temperature, setting or adjusting pump speed, setting or adjusting timer settings, setting or adjusting duration of pump operation, setting or adjusting period of pump inactivity, and the like. These control signals would travel back along the previously described network to the specific HWS components affected by the control instructions.

As described in conjunction with FIG. 1, a very useful sensor component is a temperature sensor 154, which may be disposed in a line 156 interconnecting the pump 146 with the hot water delivery line 116 through the feeder 140, providing means for causing a controller component to stop the pump 146, thereby preventing heated water from being circulated through the cold water delivery line 118, for example, when there is already heated water in the line, or when, as a safety feature, the water temperature in the hot water line has reached a temperature maximum or threshold. The temperature sensor 154 may be of conventional or of special design inserted into the line 156 for water flow thereover, or it may be a thermostat type of detector, for example, strapped to the outside of the line 156, or incorporated into the hot water source 112 or pump 146. The sensor 154 may be of a type for detecting a selected water temperature and in conjunction with a controller component causing the control system to start or stop the pump 146.

In a preferred embodiment of the present invention, a temperature sensor 154 is configured for detecting, alone or in conjunction with a controller component, a predefined ΔT threshold or temperature increase, or gradient, for example, between about 0.5° F. and about 15° F. (such as about one or about two degrees) in a temperature gradient time period, and in response thereto causing a controller component 150, 178 to stop the pump 146. The temperature gradient time period may be set at, for example, about 5 seconds or more, or about 10 seconds or more, or about 30 seconds or more, or about 45 seconds or more, or about 1 minute or more, or about 2 minutes or more, or about 3 minutes or more, or about 4 minutes or more, or about 5 minutes or more, and may be subject to user modification or adjustment. Thus, no matter what the actual temperature of the water in the hot water line 156 is, an increase exceeding the ΔT threshold will cause the pump 146 to stop. The temperature sensor 154 may also be operative for detecting freezing temperature thus enabling a controller component 150, 178 to circulate water when the temperature falls below a certain temperature threshold in order that the water pipes can more likely avoid freeze damage.

The pump 146 may be activated by a controller component 150, 178 in a manner hereinabove described for controller component 40 by statistically analyzing a plurality of control signals generated by signals from HWS components, such as sensor 160. As hereinabove noted, a sensor 160 may comprise, consist essentially of, or consist of at least one sensor selected from the group consisting of: a manual switch, a motion detector, a proximity detector, a temperature detector, a flow detector 164, or a sound detector, as herein described.

Although the flow detector 164 is shown adjacent to the hot water source 112, it may be alternatively disposed elsewhere, such as in the line 140 beneath the fixture 114. In certain embodiments as many of the sensors as practicable are located substantially close to the pump and/or hot water source, in order to reduce the electrical interconnection required.

It should be appreciated that if the pump 146 is not a positive displacement type that prevents water from flowing in a reverse manner through it, then a one-way valve 170 should be provided to prevent such flow. Preferably, the one-way valve is controlled by a motor or solenoid controlled by a controller component 150, 178. The one-way valve should be inserted upstream of the pump 146 to prevent water flow through the pump 146 when a controller component such as local controller component 150 or remote controller component 178 turns off the pump 146.

Preferably the temperature sensor 154 should be disposed in the hot water line or attached to it as hereinbefore described to prevent a rescission between the hot water delivery line 116 and the cold water delivery line 118. However, the pump can be located anywhere throughout the system 110 between the hot water delivery line 116 and cold water delivery line 118.

In some examples of the present invention, a microphone 184 or sonar sensor may be attached to or within the hot water delivery line 116 providing a sound sensing means for detecting water flow in the hot water delivery line 116 and generating a control signal corresponding thereto which is fed into the controller component 150 in order to turn the pump 146 the pump on or off, as hereinabove described.

In addition, a sound-producing element 182 may be installed in the hot water delivery line 116, preferably proximate to hot water source 112, for generating a characteristic sound in response to water flow in the hot water delivery line 116. Alternatively the sensor and/or controller can be structured to recognize and distinguish the sound of the pump, or of the flow of hot (or cold) water in the line. Alternatively, a sound sensor such as a microphone may work with voice recognition means in the controller component to activate or deactivate HWS components by voice command.

A sound-producing element, if present, may include any rotatatable device powered by water flow (not shown) which produces a sound when rotated by water flowing therepast. However, any suitable sound-generating element 182 may be utilized in the present invention. Since the sound naturally travels extremely well through water in the delivery line 116, no separate wiring is necessary and the sound sensor 084 is preferably configured in any conventional manner for being sensitive to the sound generated, for example, by the element 182. As hereinabove noted, a separate microphone, or sound sensitive device, 184 may be utilized for voice or sound activation for production of a control signal for inputting to a controller component.

While the present invention has been described above as a whole home or commercial plumbing installation, it should be appreciated that, the present invention may be used in zones of a larger plumbing system as hereinafter described. That is, rooms or other areas may be zoned if the plumbing is in a "Trunk and Branch"-type line system.

For example, in FIG. 3A is shown an example of such a system, in which the plumbing system is designed so that there is not a hot water conduit laid out in a single loop, but rather the plumbing is designed to serve discrete zones of a single structure, or more than one structure, each of which may have its own unique hot water demand patterns. As depicted in FIG. 3A, the structure is a multistory building, such as an apartment building or condominium complex. The HWS is structured as follows: water is conveyed from a water source 301 via conduit 303 to a hot water source, such as a boiler 305. Pump 307 is used to direct hot water into a conduit 311 having a large enough bore to service all feeder loops 315 simultaneously which extends along a dimension of the structure, and is preferably insulated to retain the temperature of hot water within the bore thereof. Feeder loops 315 in fluid communication with conduit 311 extend vertically along, and preferably on either side of, a vertically extending common wall of the structure 323 separating rooms plumbed with hot water fixtures 319. The rooms may contain one or more sensor 321, such as a motion sensor or a sensor that sends a signal when a plumbing fixture is opened, to inform the HWS controller component(s) (for example, 309) when a particular feeder loop is required to be charged with hot water.

In an alternative embodiment a hot water storage tank may be interposed between the hot water source and the conduit. The hot water storage tank may comprise a temperature sensor in communication with a controller component which operates the circulate water through the hot water source in order to maintain the water at a given temperature.

When a sensor 321 in or proximate to a room or area served by a given feeder loop 315 indicates that the room or area has a hot water demand, a pump 317 serving that feeder loop 315 is turned on so that hot water from conduit 311 may circulate in that loop and is available for use in any of the rooms or areas served by that feeder loop. Temperature sensors 323 may be placed downstream of the pump on each feeder loop 315 to indicate a change in the temperature of the recirculating water over time, as previously discussed in conjunction with other examples. If an increase in the predetermined ΔT threshold indicates that the feeder loop 315 is charged with hot water, the temperature sensor 321 may send a signal to the controller component to shut the pump 317 serving that feeder loop 315 off. Similarly, if the hot water reaches a maximum threshold temperature, the controller component 309 may turn the pump 317 off. In a preferred embodiment both of these functions override any other instruction (such as by a timer component control signal or a sensor control signal 321) to turn the pump on. Also, if the water temperature within a feeder loop 315 reaches a predefined minimum temperature, such as a temperature from about 5° F. to about 0° F., the temperature sensor 323 may send a signal to the controller component 309 to turn the pump on, thereby preventing the feeder loop 315 from suffering damage due to freezing water. Again, preferably this function would override a contrary instruction to turn the pump off which might otherwise be given by the controller component.

Preferably both HWS sensor signals and HWS control signals are relayed to a central local controller, router, or modem. For example, the signals may be relayed between local controller component 309 and feeder loop pumps 317, and HWS components such as, without limitation, motion sensors 321 and temperature sensors 323 through an electrical conduit 327, which receives cables or wiring from HWS components along each feeder loop 315. Alternatively sensor and control signals may be sent wirelessly to the local controller, modem or router.

As shown in FIGS. 3A and 3B, the local controller, modem or router preferably sends these signals to a remotely located controller component 333, 335. For example, the signals may be sent via an Ethernet or cable line, a PLN as described earlier, or wirelessly to a remotely located controller component residing on or in one or more computer 335 located, for example, in a control room within the building, or (for multi-building HWS systems) a separate maintenance building. The sensor signals may be sent, for example, to a software program in which parameters such as water temperature, water flow, feeder loops activated, electrical power usage, and the status of pumps and the HWS can all be monitored and controlled. In certain cases, this software program may also include other structure sensing and control features, such as one or more of features such as, without limitations, surveillance cameras, door locking and unlocking, structure and landscape lighting, appliances such as refrigerators, air conditioning, heating, garage access, special zone access, security systems, fire alarms.

The control or sensor signals may also, or alternatively, be uploaded to the internet, for example, to one or more web pages for accessing by, for example, remote users such as a building management company. Alternatively or additionally, control or sensor signals may be sent to a wireless remote computing device, such as a mobile telephone 333 or tablet computing device, for example, to be received by a software program or app loaded on such a device. It is contemplated that on such a device a user may receive information such as statistical data regarding energy and water usage, and HWS status alerts, and send control instructions to the HWS, for example to turn system components on or off, to adjust time or temperature thresholds, including ΔT thresholds, and to override contrary controller component instructions.

FIG. 3B shows an alternative configuration of the system shown in FIG. 3A, in which sensor and control signals are routed through a local controller, modem or router 309 connected by a cable (332) to a DSL cable outlet 331 to the internet, wherein the signals may be uploaded to a mobile telephone 333, for example, through push notification or SMS (text) messaging technology. Alternatively, the receiving instrument may be any mobile computing device, such as a tablet computing device or a laptop computer.

A method in accordance with the present invention may include sensing and/or controlling activation or inactivation of a pump, sensing and/or directly or indirectly controlling water temperature in one or more hot water line, measurement of water temperature and/or water flow in a conduit to and/or from a hot water source; detection of water leaks in hot and cold water lines; detection of water pressure in water lines or conduits; measurement of water temperature in hot water flow from a hot water source; measurement of moisture in walls and floors; detection of activation of water flow dampers; measurement of room temperature in each of a plurality of rooms; detection of a "power on" or "power off" condition; and detection of operation of a water circulation pump.

A controller component preferably records with respect to at least one such event at least one parameter selected from the group consisting of date, day of the week, start time, duration of pump activation, hot water flow and temperature and cold water flow and temperature; and analyzes the event and the recorded parameter to determine patterns of hot water demand; and activates the pump and controls HWS components in accordance with the determined patterns.

Preferably, the method further includes reiterating the steps of sensing, recording, analyzing, and activating/controlling after expiration of a predetermined analytical time period. This time period may be, for example, one day, one week, or one month. In this way the HWS learns patterns of water usage and hot water demand as they change.

In addition, the method may include analyzing the determined patterns for potential problems and issuing HWS status alerts. Such potential problems may include leaks, excessive running of the pump 30, excessive pressure, system temperatures near the high and low temperature thresholds, notice of a "power off" or "power on" condition, and non-seasonal changes in a selection between hot water and cold water use among others.

Although there has been hereinabove described specific examples of compositions and methods for operating a residential or commercial plumbing system, such as an "on command" hot water system in accordance with the present invention, it will be appreciated that the invention is not limited thereto. That is, any element described in this specification may be combined with one or more additional element, and any described combination may have one or more element substituted or omitted, without departing from the spirit and scope of the invention. One or more features of any example may be combined with one or more features of any other example, and remain within the description of the invention. Any range of temperatures, time, or other measurements described in this specification includes all points and subranges within the high and low measurement of the range listed, to $\frac{1}{10}^{th}$ (one decimal place) of a unit of measurement. The present invention may suitably comprise, consist of, or consist essentially of the recited elements. Accordingly, any and all modifications, variations or equivalent arrangements which may occur to those skilled in the art, should be considered to be within the scope of the present invention as defined in the appended claims.

Each and every publication, patent, and published patent application cited or referenced in this specification is hereby expressly incorporated by reference herein in its entirety.

I claim:

1. A remotely located controller component for a structural on demand hot water system (HWS), said HWS comprising a hot water source, a hot water delivery line, a hot water return line, one or more sensors, and a hot water circulation pump; comprising:
    a controller component remotely located from said HWS for coordinating water and energy use comprising a microprocessor having a memory component, at least one input connector component for receiving sensor signals, and at least one output connector component for sending control signals,
    at least one sensor comprising a temperature sensor, said temperature sensor detecting water temperature at said hot water delivery line or said hot water return line over a temperature gradient time period; said remotely located controller component being structured to receive temperature data from said temperature sensor, detect a change in hot water line temperature (ΔT) at said sensor over a temperature gradient time period; and export a control signal to one or more HWS components;
    wherein said controller component receives signals from, and/or sends signals to, said one or more HWS components wirelessly.

2. The remotely located controller component of claim 1 structured to receive sensor signals from, and send control signals to, the HWS via the internet.

3. The remotely located controller component of claim 2 structured to receive sensor signals from, and send control signals to, the HWS via the internet using a method selected from the group consisting of wifi, Bluetooth®, satellite, and a cellular telephone network.

4. The remotely located controller component of claim 2 wherein the controller component is structured to receive sensor signals from and/or send control signals to one or more device selected from the group consisting of: an alarm system, a refrigerator, an air conditioner, a heating system, a door lock, and structural lighting, in addition to the HWS.

5. The remotely located controller component of claim 2 wherein said one or more HWS components are selected from the group consisting of a water flow sensor, a water line pressure sensor, a water temperature sensor, a pump status sensor, a pump flow rate sensor, a hot water source status sensor, a hot water source thermostat, a moisture detector, a time of day indicator, a day of week indicator, and a timer status detector.

6. The remotely located controller component of claim 5 wherein said controller is structured to cause the display of status data received from said one or more HWS component.

7. The remotely located controller component of claim 5 wherein said controller is structured to accept user input and transmit a control signal based thereon to said one or more HWS component.

8. The remotely located controller component of claim 1 structured to detect an event selected from the group consisting of a loss of water pressure, a loss of water flow, or a lack of hot water in the hot water line, and if such event is detected to turn the pump on for a predetermined circulation time period to attempt to re-prime the lines.

9. The remotely located controller component of claim 1 structured to determine patterns of pump activity, water presence or flow, water pressure, temperature, period of pump activity or inactivity, period of hot water source activity or inactivity.

10. A remotely located controller component for a structural on demand hot water system (HWS), said HWS comprising a hot water source, a hot water delivery line, a hot water return line, one or more sensors, and a hot water circulation pump; comprising:
    a controller component remotely located from said HWS for coordinating water and energy use comprising: a microprocessor having a memory component, at least one input connector component for receiving sensor signals, and at least one output connector component for sending control signals,
    at least one sensor sending a sensor signal to said controller component detecting a change in water temperature (delta T) at said hot water delivery line or said hot water return line over a temperature gradient time period; said controller component being structured to export a control signal to one or more HWS components;
    wherein said controller component is structured to receive signals from, and sends signals to, said one or more HWS components wirelessly.

11. The controller component of claim 10, being comprised as part of a device selected from the group consisting of a computer, tablet computing device, or mobile telephone.

12. The controller component of claim 10, being comprised in association with a device selected from the group consisting of a computer, tablet computing device, or mobile telephone.

\* \* \* \* \*